(12) United States Patent
Tan et al.

(10) Patent No.: US 12,452,970 B2
(45) Date of Patent: Oct. 21, 2025

(54) EMERGENCY POWER SUPPLY DIMMING CIRCUIT UNDER THE CONTROL OF CURRENT SUPPLY AND 0-10V VOLTAGE

(71) Applicant: Dongguan Haiyue Intelligent Technology Co., Ltd, Dongguan (CN)

(72) Inventors: Huishi Tan, Shenzhen (CN); Tengfei Zhou, Yichun (CN)

(73) Assignee: Dongguan Haiyue Intelligent Technology Co., Ltd, Dongguan (CN)

( * ) Notice: Subject to any disclaimer, the term of this patent is extended or adjusted under 35 U.S.C. 154(b) by 120 days.

(21) Appl. No.: 18/514,703

(22) Filed: Nov. 20, 2023

(65) Prior Publication Data
US 2025/0106959 A1    Mar. 27, 2025

(30) Foreign Application Priority Data
Sep. 22, 2023    (CN) .......................... 202322610200.6

(51) Int. Cl.
*H05B 45/10*     (2020.01)
*H05B 45/325*    (2020.01)
*H05B 45/345*    (2020.01)

(52) U.S. Cl.
CPC ........... *H05B 45/10* (2020.01); *H05B 45/325* (2020.01); *H05B 45/345* (2020.01)

(58) Field of Classification Search
CPC ........ H05B 47/172; H02H 9/001; H02H 7/20; H02H 11/002; H02H 9/041; H02H 7/1213; H02H 9/002; H02H 7/18; H02H 1/0007; H02H 11/00; H02H 1/003; H02H 3/021; H02H 3/093; H02H 3/10; H02H 3/20; H02H 9/04; H02H 5/04; H02H 9/02; H02H 3/087; H02H 9/005; H02H 9/025; H02H 9/045; H02H 3/027; H02H 3/08; H02H 3/12; H02H 3/26; H02H 3/38; H02H 3/202; H02H 7/12; H02H 3/243; H02H 9/00; H02H 11/003; H02H 7/04; H02H 7/125; H02H 7/205; H02H 11/006; H02H 3/04; H02H 3/207; H02H 3/24; H02H 5/041; H02H 9/042; H02H 3/105; H02H 3/325; H02H 5/00; H02H 5/08; H02H 7/1203;
(Continued)

(56) References Cited

U.S. PATENT DOCUMENTS

2013/0127362 A1* 5/2013 Trainor .................. H02J 9/065
                                                        324/414

FOREIGN PATENT DOCUMENTS

| CN | 112672480 A | 4/2021 |
|---|---|---|
| CN | 212970174 U | 4/2021 |
| CN | 219592668 U | 8/2023 |

* cited by examiner

*Primary Examiner* — Henry Luong
(74) *Attorney, Agent, or Firm* — Nitin Kaushik (57) ABSTRACT

The utility model discloses an emergency power supply dimming circuit under the control of a current supply and a 0-10V voltage, including: an inductor main control circuit including an MCU chip U3, a power supply input corresponding to the MCU chip U3 being connected to a 5V VCC terminal, and an output terminal corresponding to the MCU chip U3 being connected to a DIM1-SIGNAL1 terminal and an MW-PWM terminal; and an emergency power supply main control circuit including an MCU chip U7, an input terminal corresponding to the MCU chip U7 being connected to a DIM1-SIGNAL2 terminal, and an output terminal corresponding to the MCU chip U7 being connected to a UPS PWM terminal and an IO terminal.

10 Claims, 6 Drawing Sheets

(58) Field of Classification Search
CPC .... H02H 7/1252; H02H 7/1257; H02H 9/026; H02H 9/06; H01H 2300/03; H01H 13/83; H01H 9/181; H01H 2219/062; H01H 23/025; H01H 2219/039; H01H 13/023; H01H 2219/038; H01H 2219/056; H01H 21/22; H01H 2215/044; H01H 19/14; H01H 23/145; H01H 9/0235; H01H 9/161; H01H 19/001; H01H 19/10; H01H 19/54; H01H 2231/052; H01H 2219/0622; H01H 47/00; H01H 23/143; H01H 19/025; H01H 2009/186; H01H 2215/00; H01H 2219/014; H01H 2223/04; H01H 3/02; H01H 3/22; H01H 13/14; H01H 2071/042; H01H 71/04; H01H 13/02; H01H 19/11; H01H 2219/06; H01H 2231/012; H01H 2231/016; H01H 1/14; H01H 19/115; H01H 13/48; H01H 13/503; H01H 2225/002; H01H 9/167; H01H 19/585; H01H 2231/032; H01H 2300/024; H01H 36/006; H01H 9/02; H01H 9/182; H01H 2300/032; H01H 25/002; H01H 9/0271; H01H 2009/164; H01H 2219/04; H01H 2219/046; H01H 13/183; H01H 15/00; H01H 15/102; H01H 19/08; H01H 2235/01; H01H 9/54; H01H 13/64; H01H 13/7013; H01H 21/025; H01H 2217/024; H01H 2219/05; H01H 2219/066; H01H 2221/016; H01H 23/003; H01H 23/24; H01H 47/32; H01H 9/18; H01H 1/00; H01H 19/02; H01H 19/60; H01H 19/62; H01H 2219/037; H01H 2219/044; H01H 3/40; H01H 13/06; H01H 13/82; H01H 13/86; H01H 15/025; H01H 15/10; H01H 19/04; H01H 2213/01; H01H 2213/014; H01H 2219/064; H01H 2223/002; H01H 2223/004; H01H 2237/008; H01H 3/0213; H01H 9/287; H01H 13/00; H01H 2003/0293; H01H 2219/02; H01H 2225/03; H01H 2239/03; H01H 2239/032; H01H 2239/074; H01H 25/06; H01H 35/025; H01H 39/004; H01H 47/002; H01H 79/00; H01H 9/00; H01H 9/0228; H01H 9/061; H01H 9/16; H01H 9/22; H01H 9/548; H01H 13/7065; H01H 2219/016; H01H 23/00; H01H 23/14; H01H 23/28; H01H 25/00; H01H 3/26; H01H 3/42; H01H 36/0006; H01H 9/04

See application file for complete search history.

EMERGENCY POWER SUPPLY DIMMING CIRCUIT UNDER THE CONTROL OF CURRENT SUPPLY AND 0-10V VOLTAGE

CROSS-REFERENCE TO RELATED APPLICATIONS

The application claims priority to Chinese patent application No. 2023226102006, filed on Sep. 22, 2023, the entire contents of which are incorporated herein by reference.

TECHNICAL FIELD

The utility model relates to the technical field of emergency lights, and more particularly to an emergency power supply dimming circuit under the control of a current supply and a 0-10V voltage.

BACKGROUND

An emergency light, as an important safety facility for a modern public building and an industrial building, is closely related to personal safety and building safety. When a fire or other disaster occurs in a building and a power supply is interrupted, the emergency light plays an important role in personnel evacuation, rescue work in firefighting, and the continued operation or necessary treatment of important production and work.

At present, an emergency lighting system consisting of an emergency power supply and a lighting fixture is connected to dimming apparatuses such as a wall switch, a timing switch, a human motion sensor and the like. People hope that the lighting fixture can provide necessary lighting in a time period in which lighting is required, and maintain low brightness or is turned off at other times according to requirements, so as to achieve compatibility among energy saving, lighting fixture utilization ratio, and emergency.

Under normal electric supply, the addition of the above apparatuses can indeed achieve the effect that people desire. When a person passes by, the lighting fixture can provide effective lighting; and when no lighting is required, the lighting fixture can be turned off or semi-bright to save power.

However, when there is no electric supply and the lighting fixture needs to provide emergency lighting, the emergency power supply starts to actively supply power to the lighting fixture, and adjusts the power of the lighting fixture to achieve a target emergency power. In this case, the dimming apparatuses (wall dimming, timed dimming, motion sensing and the like) connected to the lighting fixture do not know that emergency lighting should have priority, and would compete with emergency dimming for the control right of the lighting fixture. After a period of competition, the emergency power supply detects an abnormal load, and will cut off the power supply of the lighting fixture according to an internal setting of preferentially protecting a device, such that the emergency lighting system cannot normally operate. The biggest responsibility of a fully functional emergency lighting system is to provide emergency lighting. In this case, the emergency lighting system loses the most important emergency function.

SUMMARY

In order to solve the problems in the prior art, the utility model provides an emergency power supply dimming circuit under the control of a current supply and a 0-10V voltage. To achieve the above objective, the technical solution of the utility model is as follows:

An emergency power supply dimming circuit under the control of a current supply and a 0-10V voltage, including:

an inductor main control circuit including an MCU chip U3, a power supply input corresponding to the MCU chip U3 being connected to a 5V VCC terminal, and an output terminal corresponding to the MCU chip U3 being connected to a DIM1-SIGNAL1 terminal and an MW-PWM terminal;

an emergency power supply main control circuit including an MCU chip U7, an input terminal corresponding to the MCU chip U7 being connected to a DIM1-SIGNAL2 terminal, and an output terminal corresponding to the MCU chip U7 being connected to a UPS PWM terminal and an IO terminal;

a first dimming detection circuit, an input terminal corresponding to the first dimming detection circuit being electrically connected to the MW-PWM terminal, and an output terminal corresponding to the first dimming detection circuit being electrically connected to a dimming line DIM1+, the DIM1-SIGNAL1 terminal, and a dimming line DIM1- respectively;

a second dimming detection circuit, an input terminal corresponding to the second dimming detection circuit being electrically connected to the UPS PWM terminal, and an output terminal corresponding to the second dimming detection circuit being electrically connected to the dimming line DIM1+, the DIM1-SIGNAL2 terminal, and the dimming line DIM1- respectively; and a current supply circuit, an input terminal corresponding to the current supply circuit being electrically connected to the UPS PWM terminal, and an output terminal corresponding to the current supply circuit being electrically connected to the dimming line DIM1+, the dimming line DIM1-, and the DIM1-SIGNAL2 terminal respectively.

Optionally, the MCU chip U3 is designed as a CMS8S6990 chip, and the inductor main control circuit further includes a peripheral circuit of the CMS8S6990 chip.

Optionally, the MCU chip U7 is designed as a CMS8S6990 chip, and the emergency power supply main control circuit further includes a peripheral circuit of the CMS8S6990 chip.

Optionally, the emergency power supply dimming circuit further includes a power supply circuit; the power supply circuit includes a power supply chip U1, a capacitor C1, and a capacitor C2; the capacitor C1 is connected to an input terminal of the power supply chip U1; the capacitor C2 is connected to an output terminal of the power supply chip U1; the input terminal of the power supply chip U1 is connected to a 12V DC; and the 12V DC steps down the voltage by means of the power supply chip U1, and outputs a 5V voltage to supply power to the CMS8S6990 chip.

Optionally, the first dimming detection circuit includes a resistor R1, a resistor R2, a resistor R3, a capacitor C3, and a first proportional amplification circuit; one terminal of the resistor R1 is connected to the MW-PWM terminal, and the other terminal of the resistor R1 is connected to one terminal of the resistor R2 and one terminal of the resistor R3 respectively; the other terminal of the resistor R3 is connected to one terminal of the capacitor C3, and is further connected to an input terminal of a first proportional amplifier; the other terminal of the resistor R2 and the other terminal of the capacitor C3 are both grounded; and an output terminal of the first proportional amplifier is connected to the dimming line DIM1+.

Optionally, the first proportional amplification circuit includes an operational amplifier U2, a capacitor C4, a resistor R4, a resistor R5, a resistor R6, a capacitor C5, a resistor R7, a capacitor C6, a resistor R9, a resistor R8, a resistor R10, and a triode Q1; an inverting terminal of the operational amplifier U2 is connected to one terminal of the resistor R3; a non-inverting terminal of the operational amplifier U2 is connected to the inverting terminal by means of the capacitor C4; an output terminal of the operational amplifier U2 performs output by means of the resistor R7; the inverting terminal of the operational amplifier U2 is further connected to a base electrode of the triode Q1 by means of the resistor R6, the capacitor C5, and the other terminal of the resistor R7; the non-inverting terminal of the operational amplifier U2 is further connected to one terminal of the resistor R4, and is connected to one terminal of the resistor R8, one terminal of the resistor R9, and one terminal of the resistor R10 respectively by means of the resistor R5; the other terminal of the resistor R10 is connected to a collector electrode of the triode Q1; an emitting electrode of the triode Q1 is grounded; the other terminal of the resistor R4 is grounded; the other terminal of the resistor R8 is connected to a 12V VCC; and the other terminal of the resistor R9 is connected to one terminal of the resistor R7 by means of the capacitor C6.

Optionally, the first dimming detection circuit further includes a first detection circuit; the first detection circuit includes a resistor R11, a resistor R12, and a capacitor C7; one terminal of the resistor R11 is connected to the DIM1+ and one terminal of the resistor R10 respectively; the other terminal of the resistor R11 is connected to one terminal of the resistor R12, one terminal of the capacitor C7, and the DIM1-SIGNAL1 terminal respectively; and the other terminal of the resistor R12 and the other terminal of the capacitor C7 are both grounded, and are connected to the dimming line DIM1−.

Optionally, the second dimming detection circuit includes a resistor R13, a resistor R14, a resistor R15, a capacitor C10, and a second proportional amplification circuit; one terminal of the resistor R13 is connected to the UPS-PWM terminal, and the other terminal of the resistor R13 is connected to one terminal of the resistor R14 and one terminal of the resistor R15 respectively; the resistor R15 is connected to one terminal of the capacitor C10, and is further connected to an input terminal of a second proportional amplifier; the other terminal of the resistor R14 and the other terminal of the capacitor C10 are both grounded;

the second proportional amplification circuit includes an operational amplifier U9, a capacitor C11, a resistor R16, a resistor R17, a resistor R18, a capacitor C12, a resistor R19, a capacitor C13, a resistor R21, a resistor R20, a resistor R22, and a triode Q2; an inverting input terminal of the operational amplifier U9 is connected to one terminal of the resistor R15; a non-inverting terminal of the operational amplifier U9 is connected to the inverting terminal by means of the capacitor C11; an output terminal of the operational amplifier U9 performs output by means of the resistor R19; the inverting terminal of the operational amplifier U9 is further connected to one terminal of the resistor R19 by means of the resistor R18 and the capacitor C12, and is connected to a base electrode of the triode Q2; the non-inverting terminal of the operational amplifier U9 is further connected to one terminal of the resistor R16, is connected to one terminal of the resistor R20, one terminal of the resistor R21, and one terminal of the resistor R22 respectively by means of the resistor R17, and is connected to the DIM1+; the other terminal of the resistor R22 is connected to a collector electrode of the triode Q2; an emitting electrode of the triode Q2 is grounded; the other terminal of the resistor R16 is grounded; the other terminal of the resistor R20 is connected to the 12V VCC; and the other terminal of the resistor R21 is connected to one terminal of the resistor R19 by means of the capacitor C13.

Optionally, the second dimming detection circuit further includes a second detection circuit; the second detection circuit includes a resistor R23, a resistor R24, and a capacitor C14; one terminal of the resistor R23 is connected to the DIM1+ and one terminal of the resistor R22 respectively; the other terminal of the resistor R23 is connected to one terminal of the resistor R24, one terminal of the capacitor C14, and the DIM1-SIGNAL2 terminal respectively; and the other terminal of the resistor R24 and the other terminal of the capacitor C14 are both grounded, and are connected to the dimming line DIM1−.

Optionally, the current supply circuit includes a voltage stabilizing diode Z1, a resistor R25, a triode Q4, a triode Q3, a resistor R26, a resistor R27, a capacitor C15, a triode Q5, a resistor R28, a resistor R29, a diode D1, a resistor R30, a resistor R31, and an operational amplifier U10; one terminal of the voltage stabilizing diode Z1 is connected to one terminal of the resistor R25; the other terminal of the voltage stabilizing diode Z1 is connected to a collector electrode of the triode Q4; the other terminal of the resistor R25 is connected to the collector electrode of the triode Q3; a base electrode and an emitting electrode of the triode Q4 are respectively connected to a base electrode of the triode Q3 and one terminal of the resistor R26; the other terminal of the resistor R26 is grounded; one terminal of the resistor R27 is connected to a non-inverting terminal of the operational amplifier U10 by means of one terminal of the capacitor C15 and the resistor R28; the other terminal of the resistor R27 is connected to the IO terminal; and the other terminal of the capacitor C15 is grounded; an inverting terminal of the operational amplifier U10 is connected to the dimming line DIM1+ by means of one terminal of the resistor R30, the resistor R31, and the diode D1; the other terminal of the resistor R30 is grounded; an output terminal of the operational amplifier U10 is connected to a base electrode of the triode Q5 by means of the resistor R29; a collector electrode of the triode Q5 is electrically connected to an emitting electrode of the triode Q3; an emitting electrode of the triode Q5 is connected to one terminal of the resistor R31 and one terminal of the diode D1 respectively.

The technical solution of the utility model has the following beneficial effects:

In the utility model, voltage signals of a first port circuit, a second port circuit, and a power regulation circuit can be detected by means of the CMS8S6990 chip in an emergency mode and a non-emergency mode, and then the corresponding mode is determined to control the output of a lighting port circuit; the lighting fixture is only controlled by D5V at the same time; the output of the D5V only comes from the signal of DV3 or DV1*P at the same time, so as to avoid competing for control right with an external automatic dimming circuit in the emergency mode, thereby solving the problem that the emergency power supply cannot supply emergency power due to a detection error; therefore, the emergency power supply may share the same lighting fixture with another dimming circuit, thereby achieving perfect compatibility between lighting and emergency, and solving the incompatibility problem among the emergency power supply, the lighting fixture, and the automatic dimming device.

DETAILED DESCRIPTION OF THE EMBODIMENTS

The embodiments of the utility model will be described in detail below, and the examples of the embodiments are shown in the drawings, wherein the same or similar reference signs from beginning to end denote the same or similar elements or the elements having the same or similar functions. The embodiments described below with reference to the drawings are for illustration only, and are intended to explain the utility model, but not to limit the utility model.

In the descriptions of the utility model, it should be understood that the azimuth or position relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", etc. are on the basis of the azimuth and position relationships as shown in the drawings, and are only intended to facilitate and simplify the description of the utility model, but not intended to indicate or imply that the designated apparatuses or elements must have a specific azimuth or are constructed and operated in a specific azimuth. Therefore, the terms cannot be considered to limit the utility model.

In addition, the terms "first" and "second" are used for the purpose of description only, but cannot be considered to indicate or imply relative importance or implicitly indicate the number of the indicated technical features. Therefore, the feature defined by "first" or "second" may explicitly or implicitly include one or more features. In the description of the utility model, "a plurality of" means two or more, unless otherwise specifically defined.

In the utility model, unless otherwise stated or defined, the terms "mount", "connect", "connection", "fix", etc. should be understood in a broad sense, for example, the term "connection" can be a fixed connection, a detachable connection, or an integral connection, can be a mechanical connection, or an electrical connection, and can be a direct connection, an indirect connection by means of an intermediate medium, or an internal communication between two elements. A person skilled in the art may understand the specific meanings of the above terms in the utility model according to specific circumstances.

In the utility model, unless otherwise stated or defined, that a first feature is "above" or "below" a second feature may include that the first feature and the second feature are in direct contact, and may further include that the first feature and the second feature are not in direct contact but in contact by means of another feature therebetween. Moreover, that the first feature is "above", "on" and "over" the second feature includes that the first feature is over or above the second feature, or only indicates that the horizontal height of the first feature is higher than that of the second feature. That the first feature is "below", "under" and "beneath" the second feature includes that the first feature is under or below the second feature, or only indicates that the horizontal height of the first feature is lower than that of the second feature.

With reference to FIGS. 1-5, the utility model provides an emergency power supply dimming circuit under the control of a current supply and a 0-10V voltage, including:

an inductor main control circuit 2 including an MCU chip U3, a power supply input corresponding to the MCU chip U3 being connected to a 5V VCC terminal, and an output terminal corresponding to the MCU chip U3 being connected to a DIM1-SIGNAL1 terminal and an MW-PWM terminal;

an emergency power supply main control circuit 4 including an MCU chip U7, an input terminal corresponding to the MCU chip U7 being connected to a DIM1-SIGNAL2 terminal, and an output terminal corresponding to the MCU chip U7 being connected to a UPS PWM terminal and an IO terminal;

a first dimming detection circuit 1, an input terminal corresponding to the first dimming detection circuit 1 being electrically connected to the MW-PWM terminal, and an output terminal corresponding to the first dimming detection circuit being electrically connected to a dimming line DIM1+, the DIM1-SIGNAL1 terminal, and a dimming line DIM1− respectively;

a second dimming detection circuit 3, an input terminal corresponding to the second dimming detection circuit 3 being electrically connected to the UPS PWM terminal, and an output terminal corresponding to the second dimming detection circuit 3 being electrically connected to the dimming line DIM1+, the DIM1-SIGNAL2 terminal, and the dimming line DIM1− respectively; and a current supply circuit 5, an input terminal corresponding to the current supply circuit 5 being electrically connected to the UPS PWM terminal, and an output terminal corresponding to the current supply circuit 5 being electrically connected to the dimming line DIM1+, the dimming line DIM1−, and the DIM1-SIGNAL2 terminal respectively.

When the emergency power supply main control circuit 4 needs to enter an emergency mode, the current supply circuit 5 is controlled to input a current into the dimming line DIM1+ and the dimming line DIM1−; when most of the current flows through the DIM1+ and into the first dimming detection circuit 1, the current flows through the resistor R10 and triode Q1 in the first dimming circuit; in this case, the voltage of the DIM+ is approximately equal to a product of the current flowing through the resistor R10 and a resistance of the resistor R10; the first dimming detection circuit 1 performs detection and identification, identifies an emergency code and an emergency power signal, and preferentially identifies the emergency power signal; if the signal is identified as a non-emergency power signal, then the inductor main control circuit 2 normally controls the dimming line DIM1+, so as to control the dimming of the lighting fixture; if the signal is identified as an emergency power signal, then the inductor main control circuit 2 does not control the dimming line DIM1+ any more, in which case the dimming line DIM1+ is controlled by the emergency power supply main control circuit 4. When the emergency power supply main control circuit 4 is in the emergency mode, the current supply circuit 5 is controlled to input a current into the dimming line DIM1+ and the dimming line DIM1−; in this case, the voltage of the dimming line DIM1+ is equal to a product of the current flowing through the first dimming detection circuit 1 and a resistance thereof; when the power supply main control circuit 4 needs to control the voltage of the dimming line DIM1+ to reach a certain voltage, the voltage of the dimming line DIM1+ can be maintained at a target voltage by controlling the current inputted into the DIM1+ by the current supply circuit 5 and controlling the second dimming detection circuit 3 to operate, such that the emergency power supply of the emergency power supply main control circuit can supply emergency power normally.

Figure 2:
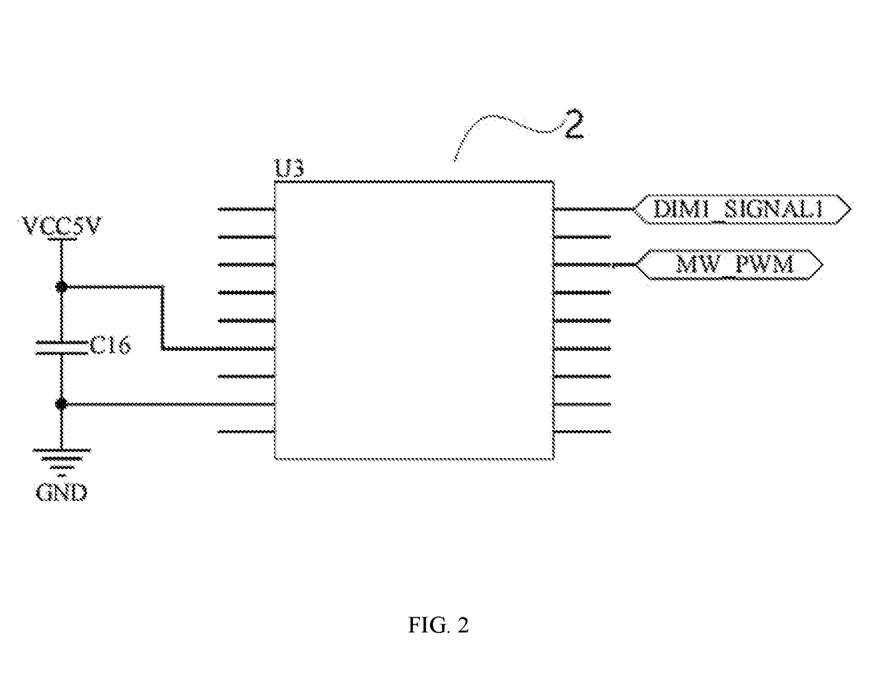
FIG. 2 is a schematic diagram of an inductor main control circuit according to the utility model.

As shown in FIG. 2, in the present embodiment, the MCU chip U3 is designed as a CMS8S6990 chip, and the inductor main control circuit 2 further includes a peripheral circuit of the CMS8S6990 chip.

Figure 4:
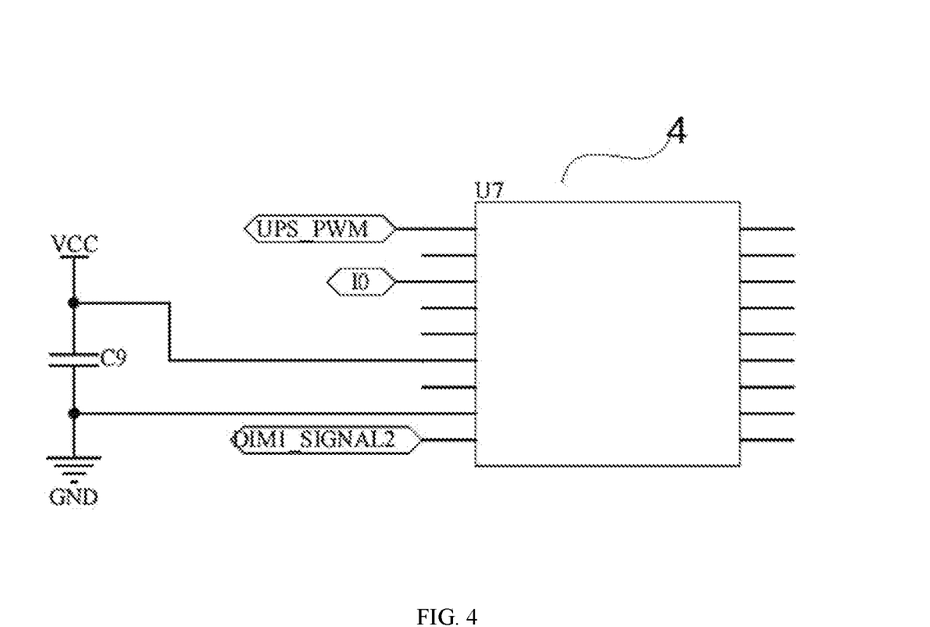
FIG. 4 is a schematic diagram of an emergency power supply main control circuit according to the utility model.

As shown in FIG. 4, in the present embodiment, the MCU chip U7 is designed as a CMS8S6990 chip, and the emergency power supply main control circuit further includes a peripheral circuit of the CMS8S6990 chip.

Figure 6:
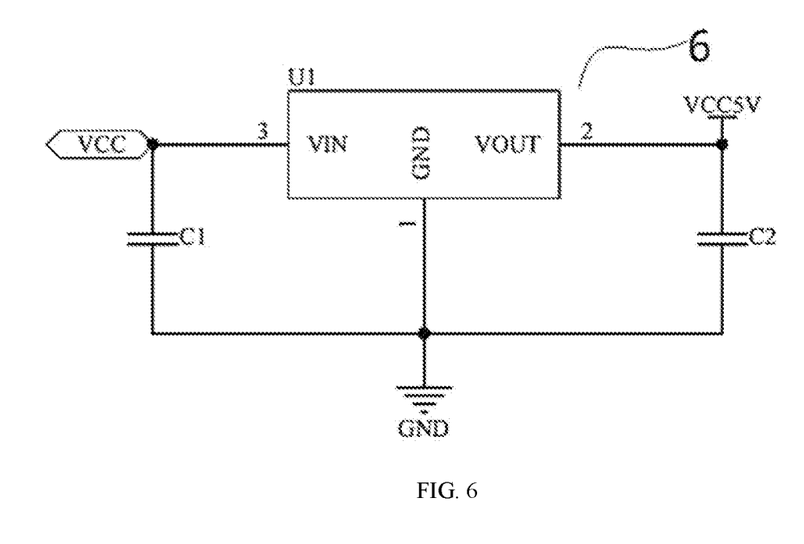
FIG. 6 is a schematic diagram of a power supply circuit according to the utility model.

As shown in FIG. 6, the emergency power supply dimming circuit further includes a power supply circuit 6; the power supply circuit 6 includes a power supply chip U1, a capacitor C1, and a capacitor C2; the capacitor C1 is connected to an input terminal of the power supply chip U1; the capacitor C2 is connected to an output terminal of the power supply chip U1; the input terminal of the power supply chip U1 is connected to a 12V DC; and the 12V DC steps down the voltage by means of the power supply chip U1, and outputs a 5V voltage to supply power to the CMS8S6990 chip.

Figure 1:
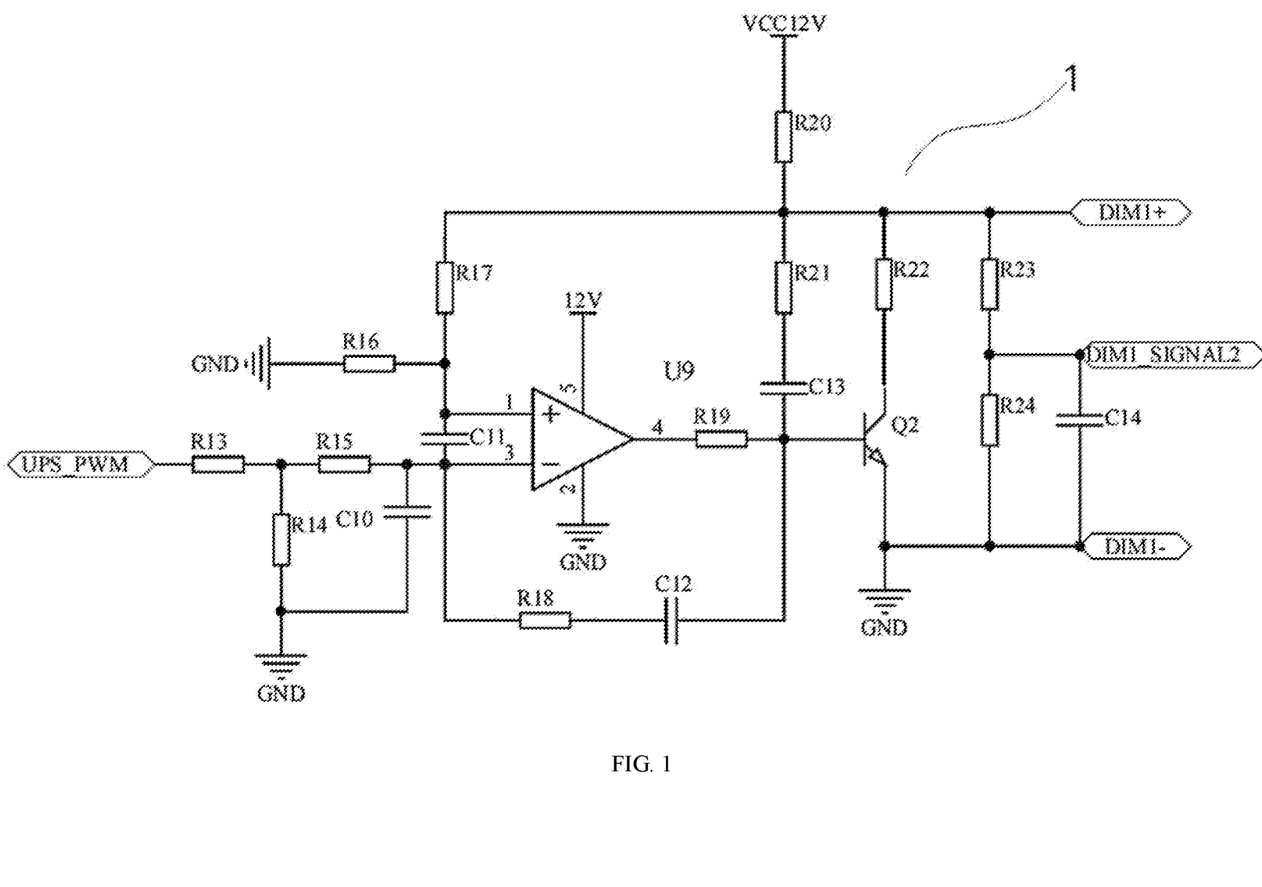
FIG. 1 is a schematic diagram of a first dimming detection circuit according to the utility model.

As shown in FIG. 1, in the present embodiment, the first dimming detection circuit 1 includes a resistor R1, a resistor R2, a resistor R3, a capacitor C3, and a first proportional amplification circuit; one terminal of the resistor R1 is connected to the MW-PWM terminal, and the other terminal of the resistor R1 is connected to one terminal of the resistor R2 and one terminal of the resistor R3 respectively; the other terminal of the resistor R3 is connected to one terminal of the capacitor C3, and is further connected to an input terminal of a first proportional amplifier; the other terminal of the resistor R2 and the other terminal of the capacitor C3 are both grounded; and an output terminal of the first proportional amplifier is connected to the dimming line DIM1+;

the first proportional amplification circuit includes an operational amplifier U2, a capacitor C4, a resistor R4, a resistor R5, a resistor R6, a capacitor C5, a resistor R7, a capacitor C6, a resistor R9, a resistor R8, a resistor R10, and a triode Q1; an inverting terminal of the operational amplifier U2 is connected to one terminal of the resistor R3; a non-inverting terminal of the operational amplifier U2 is connected to the inverting terminal by means of the capacitor C4; an output terminal of the operational amplifier U2 performs output by means of the resistor R7; the inverting terminal of the operational amplifier U2 is further connected to a base electrode of the triode Q1 by means of the resistor R6, the capacitor C5, and the other terminal of the resistor R7; the non-inverting terminal of the operational amplifier U2 is further connected to one terminal of the resistor R4, and is connected to one terminal of the resistor R8, one terminal of the resistor R9, and one terminal of the resistor R10 respectively by means of the resistor R5; the other terminal of the resistor R10 is connected to a collector electrode of the triode Q1; an emitting electrode of the triode Q1 is grounded; the other terminal of the resistor R4 is grounded; the other terminal of the resistor R8 is connected to a 12V VCC; and the other terminal of the resistor R9 is connected to one terminal of the resistor R7 by means of the capacitor C6.

In the present embodiment, the first dimming detection circuit 1 further includes a first detection circuit; the first detection circuit includes a resistor R11, a resistor R12, and a capacitor C7; one terminal of the resistor R11 is connected to the DIM1+ and one terminal of the resistor R10 respectively; the other terminal of the resistor R11 is connected to one terminal of the resistor R12, one terminal of the capacitor C7, and the DIM1-SIGNAL1 terminal respectively; and the other terminal of the resistor R12 and the other terminal of the capacitor C7 are both grounded, and are connected to the dimming line DIM1−.

Figure 3:
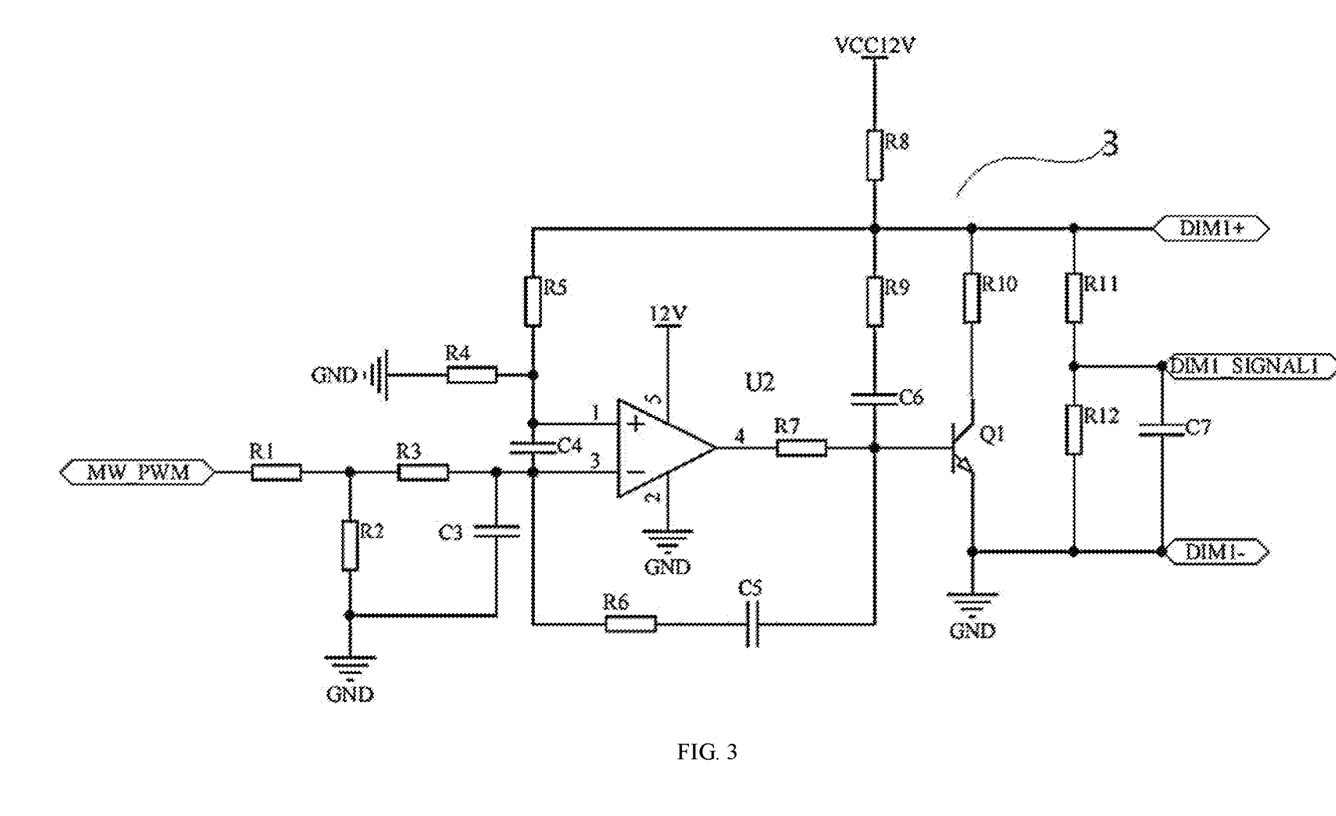
FIG. 3 is a schematic diagram of a second dimming detection circuit according to the utility model.

As shown in FIG. 3, in the present embodiment, the second dimming detection circuit 3 includes a resistor R13, a resistor R14, a resistor R15, a capacitor C10, and a second proportional amplification circuit; one terminal of the resistor R13 is connected to the UPS-PWM terminal, and the other terminal of the resistor R13 is connected to one terminal of the resistor R14 and one terminal of the resistor R15 respectively; the resistor R15 is connected to one terminal of the capacitor C10, and is further connected to an input terminal of a second proportional amplifier; the other terminal of the resistor R14 and the other terminal of the capacitor C10 are both grounded;

the second proportional amplification circuit includes an operational amplifier U9, a capacitor C11, a resistor R16, a resistor R17, a resistor R18, a capacitor C12, a resistor R19, a capacitor C13, a resistor R21, a resistor R20, a resistor R22, and a triode Q2; an inverting input terminal of the operational amplifier U9 is connected to one terminal of the resistor R15; a non-inverting terminal of the operational amplifier U9 is connected to the inverting terminal by means of the capacitor C11; an output terminal of the operational amplifier U9 performs output by means of the resistor R19; the inverting terminal of the operational amplifier U9 is further connected to one terminal of the resistor R19 by means of the resistor R18 and the capacitor C12, and is connected to a base electrode of the triode Q2; the non-inverting terminal of the operational amplifier U9 is further connected to one terminal of the resistor R16, is connected to one terminal of the resistor R20, one terminal of the resistor R21, and one terminal of the resistor R22 respectively by means of the resistor R17, and is connected to the DIM1+; the other terminal of the resistor R22 is connected to a collector electrode of the triode Q2; an emitting electrode of the triode Q2 is grounded; the other terminal of the resistor R16 is grounded; the other terminal of the resistor R20 is connected to the 12V VCC; and the other terminal of the resistor R21 is connected to one terminal of the resistor R19 by means of the capacitor C13.

In the present embodiment, the second dimming detection circuit 3 further includes a second detection circuit; the second detection circuit includes a resistor R23, a resistor R24, and a capacitor C14; one terminal of the resistor R23 is connected to the DIM1+ and one terminal of the resistor R22 respectively; the other terminal of the resistor R23 is connected to one terminal of the resistor R24, one terminal of the capacitor C14, and the DIM1-SIGNAL2 terminal respectively; and the other terminal of the resistor R24 and the other terminal of the capacitor C14 are both grounded, and are connected to the dimming line DIM1−.

Figure 5:
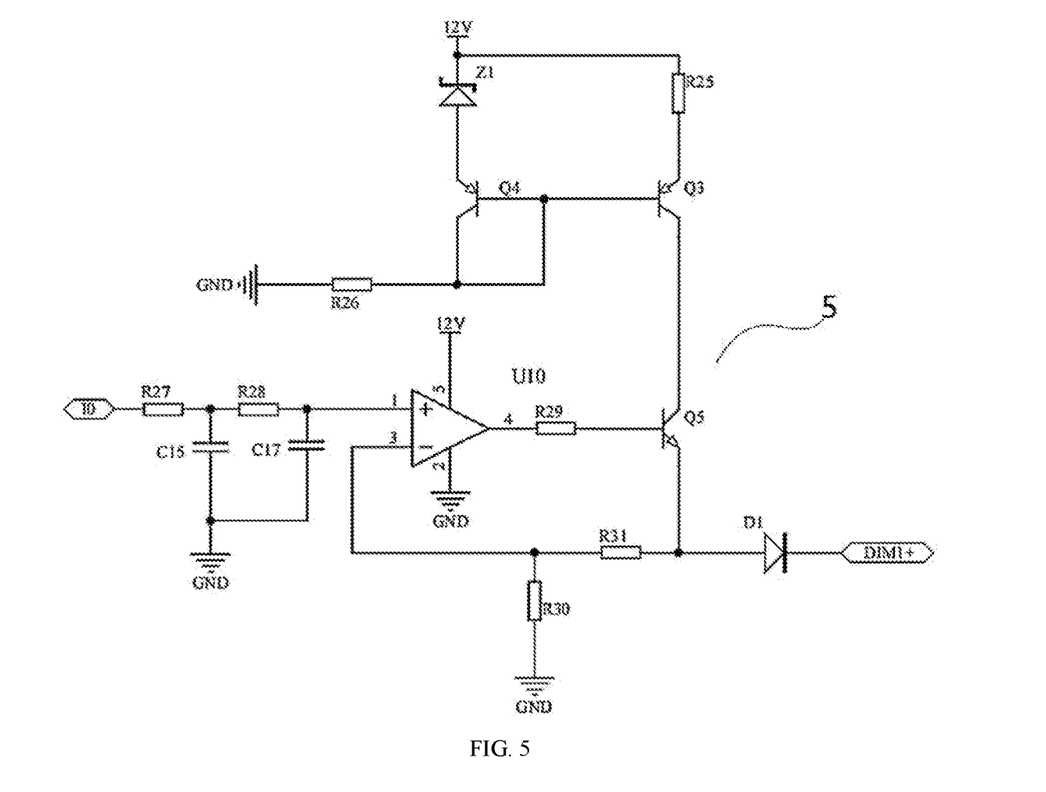
FIG. 5 is a schematic diagram of a current supply circuit according to the utility model.

As shown in FIG. 5, in the present embodiment, the current supply circuit 5 includes a voltage stabilizing diode Z1, a resistor R25, a triode Q4, a triode Q3, a resistor R26, a resistor R27, a capacitor C15, a triode Q5, a resistor R28, a resistor R29, a diode D1, a resistor R30, a resistor R31, and an operational amplifier U10; one terminal of the voltage stabilizing diode Z1 is connected to one terminal of the resistor R25; the other terminal of the voltage stabilizing diode Z1 is connected to a collector electrode of the triode Q4; the other terminal of the resistor R25 is connected to the collector electrode of the triode Q3; a base electrode and an emitting electrode of the triode Q4 are respectively connected to a base electrode of the triode Q3 and one terminal of the resistor R26; the other terminal of the resistor R26 is grounded; one terminal of the resistor R27 is connected to a non-inverting terminal of the operational amplifier U10 by means of one terminal of the capacitor C15 and the resistor R28; the other terminal of the resistor R27 is connected to the IO terminal; and the other terminal of the capacitor C15 is grounded; an inverting terminal of the operational amplifier U10 is connected to the dimming line DIM1+ by means of one terminal of the resistor R30, the resistor R31, and the diode D1; the other terminal of the resistor R30 is grounded; an output terminal of the operational amplifier U10 is connected to a base electrode of the triode Q5 by means of the resistor R29; a collector electrode of the triode Q5 is electrically connected to an emitting electrode of the triode Q3; an emitting electrode of the triode Q5 is connected to one terminal of the resistor R31 and one terminal of the diode D1 respectively.

One terminal of the current supply circuit 5 is connected to a control pin of the emergency power supply main control CMS8S6990, and the other terminal, a sink current output terminal, is connected to the DIM1+, and supplies a sink current to the DIM1+ during operation.

The operating principle of the utility model is as follows:

When no external dimming device is involved, the inductor main control circuit 2 controls the dimming circuit to control an output voltage V1 of the dimming line, and acquires a voltage V2 on the dimming line; under a normal condition, V1=V2/(R12/(R11+R12)); an error Δ1 between the output and an actual value is calculated, and is compared with a standard error value Δ; within a reasonable error range, it is determined that no other dimming device is involved in the control right competition of the dimming line; in this case, the inductor normally controls the output voltage of the dimming line.

When the emergency power supply enters the emergency mode, the emergency power supply main control circuit 4 controls a 0-10V circuit to output a voltage V3, while the first dimming detection circuit 1 acquires an actual voltage V4 of the dimming line DIM1+, wherein V3=V4/(R24/(R23+R24)). When V3 is not equal to V4, the emergency power supply main control circuit 4 controls the current supply circuit 5 to output a current I1, and the emergency power supply main control circuit 4 outputs a current control PWM signal; after the PWM signal passes through a two-stage low-pass filter consisting of a resistor R27, a resistor R28, a capacitor C15, and a capacitor C17, the PWM signal is converted into a direct current signal of which a direct current voltage is V5=voltage*PWM duty ratio; the operational amplifier U10 controls the triode Q5 to operate in an amplification region; the current flows through the emitting electrode of the triode Q3, and then flows into the collector electrode of the triode Q5; most of the current is loaded onto the resistor R10 of the second dimming detection circuit 3; in this case, the voltage of the dimming line DIM1+ is V3=I2*R10; the emergency power supply main control circuit 4 acquires the voltage of the dimming line DIM1+ as feedback; the emergency power supply main control circuit 4 uses a PID algorithm to control the output current I2 of the current supply circuit 5 and a current flowing through the emergency dimming triode Q2, so as to regulate the voltage of the dimming line DIM1+ to reach a dimming voltage required by the emergency power supply main control circuit 4; in the meanwhile, a logic 0 and a logic 1 are distinguished by means of a voltage change; a specific matching code is encoded and transmitted to the inductor main control circuit 2 by means of the dimming line DIM1+ under the voltages 0 and 1;

while the emergency power supply controls the voltage of the dimming line, the inductor main control circuit 2 compares an error between the control voltage V1 of the dimming line and the acquired actual voltage V2 of the dimming line; if the error is big, it is determined that the emergency power supply is ready to enter the emergency mode; the inductor main control circuit 2 will enter a code matching mode; after code matching is completed, the inductor main control circuit 2 enters the emergency mode, and actively releases the control right of the dimming line;

in this case, the emergency lighting system consisting of the inductor main control circuit 2 and the emergency power supply main control circuit 4 is completely controlled by the emergency power supply.

In addition, when the emergency power supply needs to enter the emergency mode, the emergency power supply main control circuit 4 controls the current supply circuit to control the triode Q5 to input a current I3 into the dimming line DIM1+; a part of the current I3 flows to the resistor R10 of the second dimming detection circuit 1 and the resistor R22 of the first dimming detection circuit 1; in this case, the current flowing through the resistor R10 is recorded as I4, and the current flowing through the resistor R22 is recorded as I5, wherein I3=I4+I5; the desired voltage of the dimming line DIM1+ is V5, and V5 is appropriately equal to V5=R22*I5. The emergency power supply main control circuit 4 only needs to control the current flowing through the triode Q2 and the sink current of the current supply, then the voltage of the resistor R22 can be controlled, and the voltage V5 of the dimming line DIM1+ can be stabilized; the actual voltage of the dimming line is obtained by sampling the dimming line of the emergency power supply; the emergency power supply main control circuit 4 calculates a voltage V5 to be outputted by the dimming line DIM1+, and controls the voltage V5 stable by controlling the sink current and the on/off of the triode Q2, so as to stabilize the dimming voltage of the DIM1+.

The descriptions above are only the preferred embodiments of the utility model, but are not intended to limit the scope of patent of the utility model, and any equivalent structural substitutions made by using the description and the drawings of the utility model under the concept of the utility model, or direct/indirect applications in other related technical fields are all concluded in the scope of patent protection of the utility model.

What is claimed is:

1. An emergency power supply dimming circuit under the control of a current supply and a 0-10V voltage, characterized by comprising:

an inductor main control circuit comprising a first MCU chip (U3), a power supply input corresponding to the first MCU chip (U3) being connected to a 5V VCC terminal, and an output terminal corresponding to the first MCU chip (U3) being connected to a DIM1-SIGNAL1 terminal and an MW-PWM terminal;

an emergency power supply main control circuit including a second MCU chip (U7), an input terminal corresponding to the second MCU chip (U7) being connected to a DIM1-SIGNAL2 terminal, and an output terminal corresponding to the second MCU chip (U7) being connected to a UPS PWM terminal and an IO terminal;
a first dimming detection circuit, an input terminal corresponding to the first dimming detection circuit being electrically connected to the MW-PWM terminal, and an output terminal corresponding to the first dimming detection circuit being electrically connected to a first dimming line (DIM1+), the DIMI-SIGNALI terminal, and a second dimming line (DIM1−) respectively;
a second dimming detection circuit, an input terminal corresponding to the second dimming detection circuit being electrically connected to the UPS PWM terminal, and an output terminal corresponding to the second dimming detection circuit being electrically connected to the first dimming line (DIM1+), the DIM1-SIGNAL2 terminal, and the second dimming line (DIM1−) respectively; and
a current supply circuit, an input terminal corresponding to the current supply circuit being electrically connected to the UPS PWM terminal, and an output terminal corresponding to the current supply circuit being electrically connected to the first dimming line (DIM1+), the second dimming line (DIM1−), and the DIM1-SIGNAL2 terminal respectively.

2. The emergency power supply dimming circuit under the control of a current supply and a 0-10V voltage according to claim 1, characterized in that the first MCU chip (U3) is designed as a CMS8S6990 chip, and the inductor main control circuit further comprises a peripheral circuit of the CMS8S6990 chip.

3. The emergency power supply dimming circuit under the control of a current supply and a 0-10V voltage according to claim 1, characterized in that the second MCU chip (U7) is designed as a CMS8S6990 chip, and the emergency power supply main control circuit further comprises a peripheral circuit of the CMS8S6990 chip.

4. The emergency power supply dimming circuit under the control of a current supply and a 0-10V voltage according to claim 3, characterized in that the emergency power supply dimming circuit further comprises a power supply circuit; the power supply circuit comprises a power supply chip (U1), a first capacitor (C1), and a second capacitor (C2); the first capacitor (C1) is connected to an input terminal of the power supply chip (U1); the second capacitor (C2) is connected to an output terminal of the power supply chip (U1); the input terminal of the power supply chip (U1) is connected to a 12V DC; and the 12V DC steps down the voltage by means of the power supply chip (U1), and outputs a 5V voltage to supply power to the CMS8S6990 chip.

5. The emergency power supply dimming circuit under the control of a current supply and a 0-10V voltage according to claim 1, characterized in that the first dimming detection circuit comprises a first resistor (R1), a second resistor (R2), a third resistor (R3), a third capacitor (C3), and a first proportional amplification circuit; one terminal of the first resistor (R1) is connected to the MW-PWM terminal, and the other terminal of the first resistor (R1) is connected to one terminal of the second resistor (R2) and one terminal of the third resistor (R3) respectively; the other terminal of the third resistor (R3) is connected to one terminal of the third capacitor (C3), and is further connected to an input terminal of a first proportional amplifier; the other terminal of the second resistor (R2) and the other terminal of the third capacitor (C3) are both grounded; and an output terminal of the first proportional amplifier is connected to the first dimming line (DIM1+).

6. The emergency power supply dimming circuit under the control of a current supply and a 0-10V voltage according to claim 5, characterized in that the first proportional amplification circuit comprises a first operational amplifier (U2), a fourth capacitor (C4), a fourth resistor (R4), a fifth resistor (R5), a sixth resistor (R6), a fifth capacitor (C5), a seventh resistor (R7), a sixth capacitor (C6), an eighth resistor (R8), a ninth resistor (R9), a tenth resistor (R10), and a first triode (Q1); an inverting terminal of the first operational amplifier (U2) is connected to one terminal of the third resistor (R3); a non-inverting terminal of the first operational amplifier (U2) is connected to the inverting terminal by means of the fourth capacitor (C4); an output terminal of the first operational amplifier (U2) performs output by means of the seventh resistor (R7); the inverting terminal of the first operational amplifier (U2) is further connected to a base electrode of the first triode (Q1) by means of the sixth resistor (R6), the fifth capacitor (C5), and the other terminal of the seventh resistor (R7); the non-inverting terminal of the first operational amplifier (U2) is further connected to one terminal of the fourth resistor (R4), and is connected to one terminal of the eighth resistor (R8), one terminal of the ninth resistor (R9), and one terminal of the tenth resistor (R10) respectively by means of the fifth resistor (R5); the other terminal of the tenth resistor (R10) is connected to a collector electrode of the first triode (Q1); an emitting electrode of the first triode (Q1) is grounded; the other terminal of the fourth resistor (R4) is grounded; the other terminal of the eighth resistor (R8) is connected to a 12V VCC; and the other terminal of the ninth resistor (R9) is connected to one terminal of the seventh resistor (R7) by means of the sixth capacitor (C6).

7. The emergency power supply dimming circuit under the control of a current supply and a 0-10V voltage according to claim 6, characterized in that the first dimming detection circuit further comprises a first detection circuit; the first detection circuit comprises an eleventh resistor (R11), a twelfth resistor (R12), and a seventh capacitor (C7); one terminal of the eleventh resistor (R11) is connected to the first dimming line (DIM1+) and one terminal of the tenth resistor (R10) respectively; the other terminal of the eleventh resistor (R11) is connected to one terminal of the twelfth resistor (R12), one terminal of the seventh capacitor (C7), and the DIM1-SIGNAL1 terminal respectively; and the other terminal of the twelfth resistor (R12) and the other terminal of the seventh capacitor (C7) are both grounded, and are connected to the second dimming line (DIM1−).

8. The emergency power supply dimming circuit under the control of a current supply and a 0-10V voltage according to claim 1, characterized in that the second dimming detection circuit comprises a thirteenth resistor (R13), a fourteenth resistor (R14), a fifteenth resistor (R15), an eighth capacitor (C10), and a second proportional amplification circuit; one terminal of the thirteenth resistor (R13) is connected to the UPS-PWM terminal, and the other terminal of the thirteenth resistor (R13) is connected to one terminal of the fourteenth resistor (R14) and one terminal of the fifteenth resistor (R15) respectively; the fifteenth resistor (R15) is connected to one terminal of the eighth capacitor (C10), and is further connected to an input terminal of a second proportional amplifier; the other terminal of the fourteenth resistor (R14) and the other terminal of the eighth capacitor (C10) are both grounded;

the second proportional amplification circuit comprises a second operational amplifier (U9), a ninth capacitor (C11), a sixteenth resistor (R16), a seventeenth resistor (R17), an eighteenth resistor (R18), a tenth capacitor (C12), a nineteenth resistor (R19), an eleventh capacitor (C13), a twentieth resistor (R20), a twenty-first resistor (R21), a twenty-second resistor (R22), and a second triode (Q2); an inverting input terminal of the second operational amplifier (U9) is connected to one terminal of the fifteenth resistor (R15); a non-inverting terminal of the second operational amplifier (U9) is connected to the inverting terminal by means of the ninth capacitor (C11); an output terminal of the second operational amplifier (U9) performs output by means of the nineteenth resistor (R19); the inverting terminal of the second operational amplifier (U9) is further connected to one terminal of the nineteenth resistor (R19) by means of the eighteenth resistor (R18) and the tenth capacitor (C12), and is connected to a base electrode of the second triode (Q2); the non-inverting terminal of the second operational amplifier (U9) is further connected to one terminal of the sixteenth resistor (R16), is connected to one terminal of the twentieth resistor (R20), one terminal of the twenty-first resistor (R21), and one terminal of the twenty-second resistor (R22) respectively by means of the seventeenth resistor (R17), and is connected to the first dimming line (DIM1+); the other terminal of the twenty-second resistor (R22) is connected to a collector electrode of the second triode (Q2); an emitting electrode of the second triode (Q2) is grounded; the other terminal of the sixteenth resistor (R16) is grounded; the other terminal of the twentieth resistor (R20) is connected to the 12V VCC; and the other terminal of the twenty-first resistor (R21) is connected to one terminal of the nineteenth resistor (R19) by means of the eleventh capacitor (C13).

9. The emergency power supply dimming circuit under the control of a current supply and a 0-10V voltage according to claim 8, characterized in that the second dimming detection circuit further comprises a second detection circuit; the second detection circuit comprises a twenty-third resistor (R23), a twenty-fourth resistor (R24), and a twelfth capacitor (C14); one terminal of the twenty-third resistor (R23) is connected to the first dimming line (DIM1+) and one terminal of the twenty-second resistor (R22) respectively; the other terminal of the r twenty-third resistor (R23) is connected to one terminal of the twenty-fourth resistor (R24), one terminal of the twelfth capacitor (C14), and the DIM1-SIGNAL2 terminal respectively; and the other terminal of the twenty-fourth resistor (R24) and the other terminal of the twelfth capacitor (C14) are both grounded, and are connected to the second dimming line (DIM1−).

10. The emergency power supply dimming circuit under the control of a current supply and a 0-10V voltage according to claim 9, characterized in that the current supply circuit comprises a voltage stabilizing diode (Z1), a twenty-fifth resistor (R25), a third triode (Q3), a fourth triode (Q4), a twenty-sixth resistor (R26), a twenty-seventh resistor (R27), a fifteenth capacitor (C15), a fifth triode (Q5), a twenty-eighth resistor (R28), a twenty-ninth resistor (R29), a diode (D1), a thirtieth resistor (R30), a thirty-first resistor (R31), and an third operational amplifier (U10); one terminal of the voltage stabilizing diode (Z1) is connected to one terminal of th3e twenty-fifth resistor (R25); the other terminal of the voltage stabilizing diode (Z1) is connected to a collector electrode of the fourth triode (Q4); the other terminal of the twenty-fifth resistor (R25) is connected to the collector electrode of the third triode (Q3); a base electrode and an emitting electrode of the fourth triode (Q4) are respectively connected to a base electrode of the third triode (Q3) and one terminal of the twenty-sixth resistor (R26); the other terminal of the twenty-sixth resistor (R26) is grounded; one terminal of the twenty-seventh resistor (R27) is connected to a non-inverting terminal of the third operational amplifier (U10) by means of one terminal of the fifteenth capacitor (C15) and the twenty-eighth resistor (R28); the other terminal of the twenty-seventh resistor (R27) is connected to the IO terminal; and the other terminal of the fifteenth capacitor (C15) is grounded; an inverting terminal of the third operational amplifier (U10) is connected to the first dimming line (DIM1+) by means of one terminal of the thirtieth resistor (R30), the thirty-first resistor (R31), and the diode (D1); the other terminal of the thirtieth resistor (R30) is grounded; an output terminal of the third operational amplifier (U10) is connected to a base electrode of the fifth triode (Q5) by means of the twenty-ninth resistor (R29); a collector electrode of the fifth triode (Q5) is electrically connected to an emitting electrode of the third triode (Q3); an emitting electrode of the fifth triode (Q5) is connected to one terminal of the thirty-first resistor (R31) and one terminal of the diode (D1) respectively.

* * * * *